United States Patent
Strydom et al.

(10) Patent No.: US 10,733,598 B2
(45) Date of Patent: Aug. 4, 2020

(54) SYSTEMS FOR STORING CARDHOLDER DATA AND PROCESSING TRANSACTIONS

(71) Applicant: PayU Payment Solutions (Proprietary) Limited, Cape Town (ZA)

(72) Inventors: Johan Lamprecht Theron Strydom, Claremont (ZA); Henri Johan Andre Penderis, Bellville (ZA); Werner van der Vyver, Durbanville (ZA)

(73) Assignee: PAYU PAYMENT SOLUTIONS (PROPRIETARY) LIMITED, Cape Town (ZA)

( * ) Notice: Subject to any disclaimer, the term of this patent is extended or adjusted under 35 U.S.C. 154(b) by 162 days.

(21) Appl. No.: 14/899,009

(22) PCT Filed: Jul. 10, 2014

(86) PCT No.: PCT/IB2014/063002
§ 371 (c)(1),
(2) Date: Dec. 16, 2015

(87) PCT Pub. No.: WO2015/004625
PCT Pub. Date: Jan. 15, 2015

(65) Prior Publication Data
US 2016/0125397 A1    May 5, 2016

(30) Foreign Application Priority Data
Jul. 12, 2013   (ZA) .................................. 2013/05249

(51) Int. Cl.
*G06Q 20/38* (2012.01)
*G06Q 20/36* (2012.01)
(Continued)

(52) U.S. Cl.
CPC ....... *G06Q 20/3672* (2013.01); *G06Q 20/027* (2013.01); *G06Q 20/08* (2013.01); *G06Q 20/385* (2013.01); *G06Q 20/38215* (2013.01)

(58) Field of Classification Search
CPC .................................................... G06Q 20/027
(Continued)

(56) References Cited

U.S. PATENT DOCUMENTS

| 5,826,245 A * | 10/1998 | Sandberg-Diment | G06Q 20/02 705/44 |
| 7,349,867 B2 * | 3/2008 | Rollins | G06Q 20/02 705/14.65 |

(Continued)

FOREIGN PATENT DOCUMENTS

GB        2493138 A        1/2013

*Primary Examiner* — Chinedu C Agwumezie
(74) *Attorney, Agent, or Firm* — Fenwick & West LLP

(57) ABSTRACT

Systems and methods for storing cardholder data and processing transactions are provided. Cardholder data is received at a server computer, the cardholder data including consumer credentials to be stored and at least one data item not to be stored. A unique consumer reference token is obtained and combined with the data item not to be stored and the combination encrypted to form an encrypted token. The encrypted token is transmitted to a third party for storage and is erased from the server computer. At the time of transaction, the encrypted token is received and decrypted to yield the data item not to be stored, so that a transaction can be initiated using stored consumer credentials and the data item not to be stored. The unique consumer reference token encrypted together with the data item enables the server computer to perform validation checks on the encrypted token.

13 Claims, 4 Drawing Sheets

(51) Int. Cl.
*G06Q 20/08* (2012.01)
*G06Q 20/02* (2012.01)

(58) Field of Classification Search
USPC .......................................................... 705/76
See application file for complete search history.

(56) References Cited

U.S. PATENT DOCUMENTS

| | | | |
|---|---|---|---|
| 10,275,750 B2* | 4/2019 | Castrechini | G06Q 30/06 |
| 2002/0138445 A1* | 9/2002 | Laage | G06Q 20/3558 |
| | | | 705/67 |
| 2003/0167408 A1 | 9/2003 | Fitzpatrick et al. | |
| 2006/0278698 A1 | 12/2006 | Lovett | |
| 2009/0173782 A1 | 7/2009 | Muscato | |
| 2010/0274634 A1* | 10/2010 | Ifrah | H04L 9/3231 |
| | | | 705/7.11 |
| 2012/0109829 A1* | 5/2012 | McNeal | G06Q 20/3674 |
| | | | 705/67 |
| 2012/0143772 A1* | 6/2012 | Abadir | G06Q 20/401 |
| | | | 705/75 |
| 2013/0041823 A1* | 2/2013 | Wagner | G06O 20/32 |
| | | | 705/44 |
| 2013/0212012 A1* | 8/2013 | Doherty | G06Q 20/322 |
| | | | 705/40 |

* cited by examiner

SYSTEMS FOR STORING CARDHOLDER DATA AND PROCESSING TRANSACTIONS

CROSS-REFERENCE TO RELATED APPLICATIONS

This application is the United States national phase of International Application No. PCT/IB2014/063002 filed Jul. 10, 2014, and claims priority to South African Patent Application No. 2013/05249 filed Jul. 12, 2013, the disclosures of which are hereby incorporated in their entirety by reference.

FIELD OF THE INVENTION

The technology described in this application relates to systems and methods for storing cardholder data and processing transactions in a distributed system architecture, which may offer increased convenience to consumers and to merchants.

BACKGROUND TO THE INVENTION

Cardholder data is the information contained on a consumer's payment card or other payment instrument. Payment cards include credit cards, debit cards or gift cards, and are typically in the form of a plastic card with cardholder data printed on both sides and also contained in digital format on a magnetic stripe or electronic chip embedded in the payment card.

In card-not-present payment transactions, such as payments made remotely by a consumer to a merchant by means of an e-commerce website or system, a consumer typically provides at least three items of cardholder data to an e-commerce merchant: the consumer's card number, expiry date and Card Verification Value (CVV), which may also be called a Card Security Code (CSC), Card Validation Code (CVC) or Card Identification Number (CID). The card number is a 16 digit numeric code called the Primary Account Number (PAN), which is embossed on a front side of the payment card. The expiry date is a 4 digit month and year numeric code also embossed on the front side of the payment card, and the CVV is a 3 or 4 digit security code which is printed on the payment card in a non-embossed manner. The CVV number is used to validate card-not-present transactions.

During card-not-present payment transactions, such as e-commerce transactions, the e-commerce merchant receives these three items of cardholder data—the PAN, expiry date and CVV—and provides them to an acquiring bank, either directly or via an intermediary gateway or switch called a payment service provider. The acquiring bank uses the cardholder data to initiate a payment request to an issuing bank of the consumer through a payment processing network such as those provided by Visa® or MasterCard®. Payment authorization and settlement are facilitated by means of well-known processes by the payment processing network between the issuing bank and acquiring bank.

To minimize loss or theft of consumer cardholder data and prevent unauthorized use thereof, entities handling cardholder data are subject to a set of rules called the Payment Card Industry Data Security Standard (PCI DSS). In terms of current PCI DSS rules governing the storage of cardholder data by merchants and/or payment service providers, although the PAN and expiry date may be stored subject to certain requirements, the CVV may not be stored after authorization, even if it has been encrypted. The CVV may only be held in memory for the time it takes for a particular transaction to be completed. Therefore, when an e-commerce system registers a consumer and stores that consumer's cardholder data for future use, only the PAN and expiry date are stored. In territories in which card-not-present transactions require all 3 items of cardholder data to process a transaction, a consumer must therefore enter the CVV number of the payment card each time the consumer's stored cardholder data is selected and payment is made.

In some territories, issuing and acquiring banks have agreed to process transactions from specific e-commerce merchants without the need for a consumer to enter the CVV number, for example in the case of Amazon.com in the United States. In these cases, a simplified checkout experience is possible in which the consumer simply selects payment without entering further information, and the transaction is able to be processed with a single action by the consumer. However, these transactions are more susceptible to fraud as there is no CVV present and, furthermore, are not available to most merchants or in most parts of the world. For many merchants, there is currently no practical way to avoid the mandatory step of the CVV number being requested from the consumer each time a payment is made. This adds an additional step to an e-commerce transaction which may be inconvenient to the consumer and result in fewer sales for the merchant.

Embodiments of the technology aim to address these and other problems.

SUMMARY OF THE INVENTION

The technology described herein enables a method conducted at a server computer, comprising:
  receiving cardholder data belonging to a consumer, the cardholder data including consumer credentials which are to be stored and at least one data item which is not to be stored;
  obtaining a unique consumer reference token;
  storing the credentials which are to be stored on a database in association with the consumer reference token;
  combining the consumer reference token with at least a portion of the data item which is not to be stored and encrypting the combination to form an encrypted token;
  transmitting the encrypted token to a third party for storage thereof by the third party; and
  erasing the encrypted token transmitted to the third party and the combined portion of the data item which is not to be stored from all memory of the server computer.

Further features provide that, prior to being stored on the database, the credentials which are to be stored are combined with a remaining portion of the data item which is not to be stored and the combination encrypted, where the remaining portion is that portion of the data item which is not encrypted into the encrypted token.

Further features provide for the method to include, during one or more stages in which the consumer selects to pay using stored cardholder data:
  receiving the encrypted token from the third party;
  decrypting the encrypted token to extract the consumer reference token and the whole or portion of the data item which is not to be stored therefrom;
  querying the database to obtain the consumer credentials stored on the database;
  initiating a payment transaction using the consumer credentials stored on the database together with the data item which is not to be stored; and upon completion of the payment transaction, erasing the encrypted token transmitted to the third party and the combined portion of the data item which is not to be stored from all memory of the server computer.

Further features of the technology allow the steps of:

receiving a consumer identifier (ID), and storing the consumer ID in association with the consumer reference token on the database; and during each stage in which the consumer selects to pay using stored cardholder data:

receiving the consumer ID;

querying the database to find the stored consumer reference token that is associated with the consumer ID; and after decrypting the encrypted token to extract the consumer reference token and the whole or portion of the data item which is not to be stored therefrom, comparing the extracted consumer reference token with the stored consumer reference token, and if the consumer reference tokens are not the same, refusing to initiate the payment transaction.

In one embodiment, the server computer is a server computer of a payment service provider, and the cardholder data is received from or on behalf of a merchant that communicates with the payment service provider.

Still further features provide for the third party to which the encrypted token is transmitted to be the merchant.

Yet further features of the technology allow the steps of:

receiving an identifier of the merchant; and storing the identifier of the merchant in association with the consumer reference token on the database; and during each stage in which the consumer selects to pay using stored cardholder data:

receiving an identifier of the merchant; and performing a check to ensure that the merchant providing the encrypted token is the same merchant as the merchant linked to the consumer reference token, and if the merchant is not the same, refusing to initiate the payment transaction.

The merchant may be an entity which operates an e-commerce website. According to one embodiment of the technology, the merchant may receive the cardholder data from the consumer by means of the e-commerce website, in which instance the merchant transmits the cardholder data to the payment service provider using an application program interface (API) between the merchant and the payment service provider. Alternatively, upon receiving a request from a consumer to purchase an item, the merchant e-commerce website redirects the consumer to an electronically accessible interface, such as a secure website, of the payment service provider, where the cardholder data is input by the consumer.

Further features provide for the third party to which the encrypted token is transmitted to be the merchant, and for the merchant to enable the consumer to create a consumer profile with the merchant. Upon receiving the encrypted token from the payment service provider, the merchant then stores the encrypted token in association with the consumer profile for later retrieval.

In a different embodiment, the server computer is a server computer of a merchant, the cardholder data is received from an electronic device of the consumer, and the third party to which the encrypted token is transmitted is the electronic device of the consumer.

The cardholder data may include a Primary Account Number (PAN), expiry date, and Card Verification Value (CVV), the consumer credentials which are to be stored may be the PAN and expiry date, and the data item not to be stored may be the CVV.

Further features of the technology allow, after the step of receiving the cardholder data:

transmitting the cardholder data to an acquiring bank of a merchant, which in turn routes the cardholder data to an issuing bank of the consumer through a payment processing network for the issuing bank to validate the cardholder data, receiving a response from the acquiring bank indicating whether the cardholder data is valid or not, in response to the acquiring bank indicating that the cardholder data is not valid, generating a failure message indicating that the cardholder data provided was invalid and cannot be stored and preventing further steps of the method from being carried out, and in response to the acquiring bank indicating that the cardholder data is valid, carrying out the further steps of the method.

Further features provide for the consumer reference token and the portion of data item which is not to be stored to be combined and encrypted using a hardware security module, and the encrypted token to be decrypted using the hardware security module.

Still further features provide for the payment transaction to be initiated by transmitting the consumer credentials together with the data item which is not to be stored to an acquiring bank of a merchant, which is able to further process the payment transaction by means of a payment processing network.

The technology extends to a system for storing cardholder data and initiating payment transactions comprising a server computer having:

a first receiving module for receiving cardholder data belonging to a consumer, the cardholder data including consumer credentials which are to be stored and at least one data item which is not to be stored;

an obtaining module for obtaining a unique consumer reference token;

a database for storing the credentials which are to be stored on a database in association with the consumer reference token;

an encrypting module for combining the consumer reference token with at least a portion of the data item which is not to be stored and encrypting the combination to form an encrypted token;

a transmitting module for transmitting the encrypted token to a third party for storage thereof by the third party; and an erasing module for erasing the encrypted token transmitted to the third party and the combined portion of the data item which is not to be stored from all memory of the server computer.

Further features allow for the system to include:

a second receiving module for receiving the encrypted token from the third party;

a decrypting module for decrypting the encrypted token to extract the consumer reference token and the whole or portion of the data item which is not to be stored therefrom;

a querying module for querying the database to obtain the consumer credentials stored on the database; and a transaction initiating module for initiating a payment transaction using the consumer credentials stored on the database together with the data item which is not to be stored.

The technology further extends to a method conducted at a server computer of a merchant, comprising:
  receiving cardholder data belonging to a consumer, the cardholder data including consumer credentials which are to be stored and at least one data item which is not to be stored;
  transmitting the data item which is not to be stored to a server computer of a payment service provider, the payment service provider obtaining a unique consumer reference token, combining the consumer reference token with at least a portion of the data item which is not to be stored and encrypting the combination to form an encrypted token;
  receiving the encrypted token from the payment service provider, the payment service provider having erased the combined portion of the data item which is not to be stored and the encrypted token from all memory of the payment service provider; and
  storing the encrypted token on a merchant database.

Further features allow, during one or more stages in which the consumer selects to pay using stored cardholder data:
  transmitting the encrypted token to the payment service provider, the payment service provider decrypting the encrypted token to extract the consumer reference token and the whole or portion of the data item which is not to be stored therefrom, so that a payment transaction can be initiated by the payment service provider using the consumer credentials and the at least one data item which is not allowed to be stored.

The technology yet further extends to a method conducted at an electronic device of a consumer, comprising:
  transmitting cardholder data belonging to the consumer to a server computer, the cardholder data including consumer credentials which are to be stored and at least one data item which is not to be stored, wherein the server computer obtains a unique consumer reference token, stores the credentials which are to be stored on a database in association with the consumer reference token, combines the consumer reference token with at least a portion of the data item which is not to be stored and encrypts the combination to form an encrypted token, transmits the encrypted token to a third party, and erases the encrypted token transmitted to the third party and the combined portion of the data item which is not allowed to be stored from all memory of the server computer;
  during one or more stages in which a payment transaction is to be initiated:
    instructing the server computer to initiate a payment transaction using the cardholder data, wherein the server computer receives the encrypted token from the third party, decrypts the encrypted token to extract the consumer reference token and the whole or portion of the data item which is not to be stored therefrom, queries the database to obtain the consumer credentials stored on the database, initiates a payment transaction using the consumer credentials stored on the database together with the data item which is not to be stored, and upon completion of the payment transaction, erases the encrypted token transmitted to the third party and the combined portion of the data item which is not to be stored from all memory of the server computer.

BRIEF DESCRIPTION OF THE DRAWINGS

The technology will now be described, by way of example only with reference to the accompanying representations in which.

DETAILED DESCRIPTION WITH REFERENCE TO THE DRAWINGS

In this specification, the term "cardholder data" is to be given a wide meaning and includes any payment credentials that belong to a consumer, irrespective of the form of the payment credentials or the type of account or system against which the consumer transacts using those payment credentials.

Figure 1:
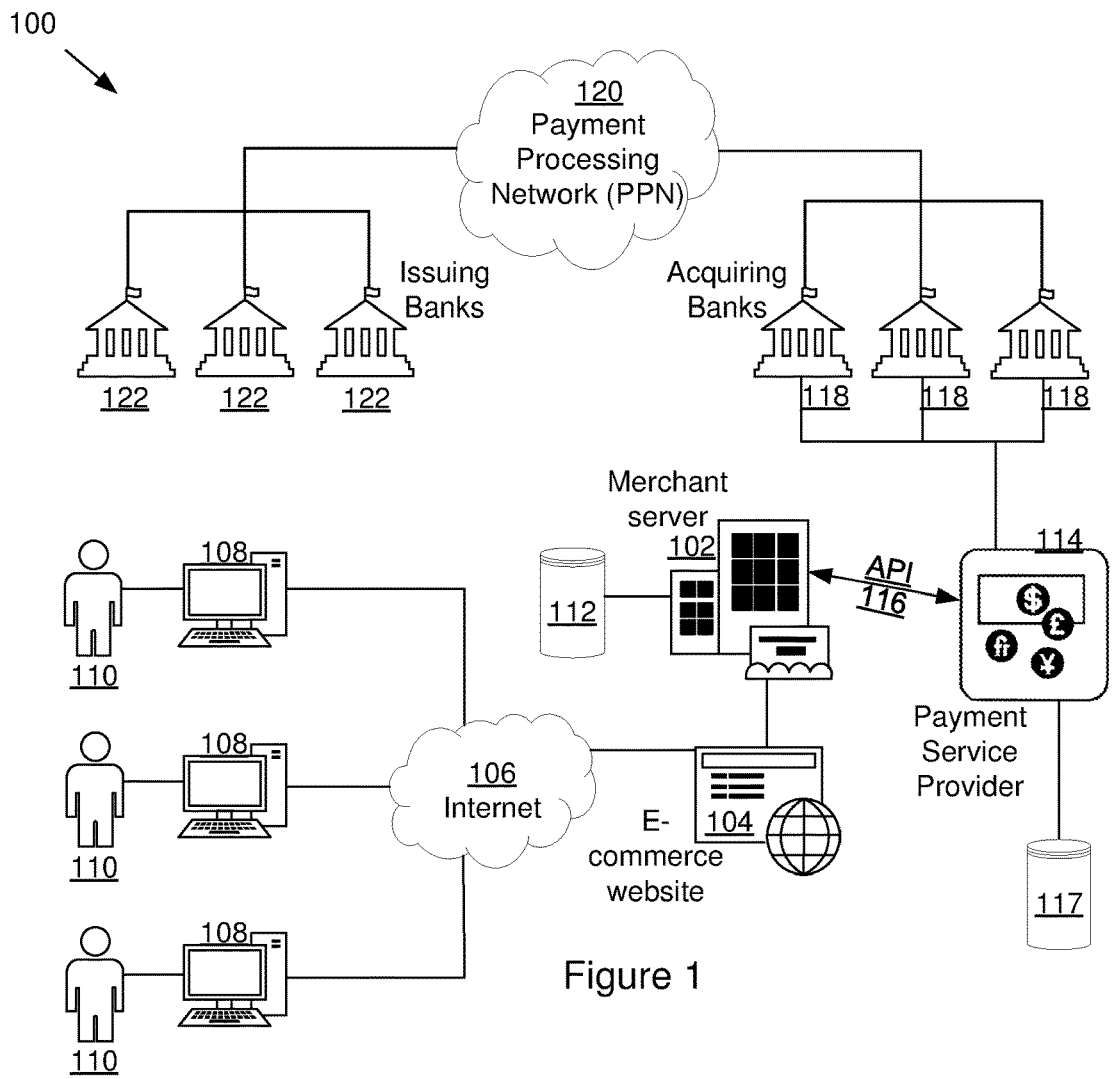
FIG. 1 is a schematic diagram of a system for storing cardholder data and processing transactions according to an embodiment of the technology.

FIG. 1 illustrates a system (100) for storing cardholder data and processing transactions according to an embodiment of the technology. The system includes a remotely accessible merchant server computer (102) which hosts an e-commerce website (104). The e-commerce website (104) is accessible through the internet (106) by a number of consumer terminal devices (108), which may be laptop or desktop computers, mobile phones, tablet computers, or the like, in each case controlled by a consumer (110). The merchant e-commerce website (104) may be any electronically accessible portal through which the merchant offers goods or services for sale to the consumers, for example an online bookstore, media store, hardware store, general retail store, facility for downloading software, or any other e-commerce site through which the consumers (110) can shop.

The merchant e-commerce website (104) enables the consumers (110) to create consumer profiles where stored preferences, purchases and other data can be associated with a consumer so as to personalize the consumer's experience when using the e-commerce website, for example by remembering the user's preferences or previous transactions. Typically, the consumer will be prompted to complete an initial sign-up or registration process in which a unique username and a consumer-selected password or other token is created by which the consumer is able to log in to the e-commerce website. The merchant server (102) has a database (112) associated therewith on which the merchant server (102) is able to store information, for example the consumer profile login credentials and data associated with the particular consumer profile.

The merchant server (102) is connected to a payment service provider (114), the payment service provider (114) also being in the form of a remotely accessible server computer. The connection between the payment service provider (114) and the merchant server (102) is by means of an application programming interface (API) (116) defined by the payment service provider, across an encrypted communication channel such as Hypertext Transfer Protocol Secure (HTTPS), Transport Layer Security/Secure Sockets Layer (TLS/SSL) or other secure channel. The merchant server (102) is required to have previously registered or signed up with the payment service provider (114) in order to set up the secure channel, and the merchant server (102) is required to provide the payment service provider (114) with certain details such as the acquiring bank with which the merchant banks.

While only one merchant server (102) with its e-commerce website (104) is shown by way of this example, it will be appreciated that the payment service provider (114) may be connected to many different merchants, each with one or more of its own e-commerce websites on which a multitude of consumers can transact.

The payment service provider (114) functions as a gateway for routing payment information to and from one of a number of acquiring banks (118) with which the payment service provider (114) has a secure connection. When processing a payment transaction on behalf of the merchant server (102), the payment service provider (114) selects the correct acquiring bank (118) of the merchant with which to transact. The acquiring bank (118), in turn, communicates through a payment processing network (120), such as Visa's VisaNet® or MasterCard's Banknet®, with an issuing bank (122) that issued cardholder data to an applicable consumer (110).

The cardholder data processed by the payment service provider (114) may be information contained on a consumer's payment card or other payment instrument, such as the consumer's credit card, debit card or gift card, or may be payment credentials issued in other ways to a consumer, such as credentials issued over-the-air to a mobile device of the consumer. The cardholder data is issued to the consumer (110) by an issuing bank (122), and is typically printed on both sides of a plastic payment card of the consumer and also contained in digital format on a magnetic stripe or electronic chip embedded in the payment card. In addition to the name of the consumer, the cardholder data contains three important pieces of information which the payment service provider requires to be able to process transactions on behalf of the merchant. These are consumer credentials in the form of a Primary Account Number (PAN) of the payment card, which may typically be a 16 digit numeric code, and the expiry date of the payment card (which may be a 4 digit month and year numeric code), as well as a data item in the form of a Card Verification Value (CVV), which may be a 3 or 4 digit security code, typically printed on the payment card and used to validate card-not-present transactions.

The payment service provider (114) has a database (117) on which it can store information, such as consumer credentials to be stored on behalf of the merchant server (102) as further described herein. In use, the payment service provider (114) is able to offer the merchant server (102) the ability for a consumer (110) to pay for a purchase on the e-commerce website (104) using stored consumer cardholder data, without requiring the consumer (110) to enter the CVV of his or her stored cardholder data.

Figure 2:
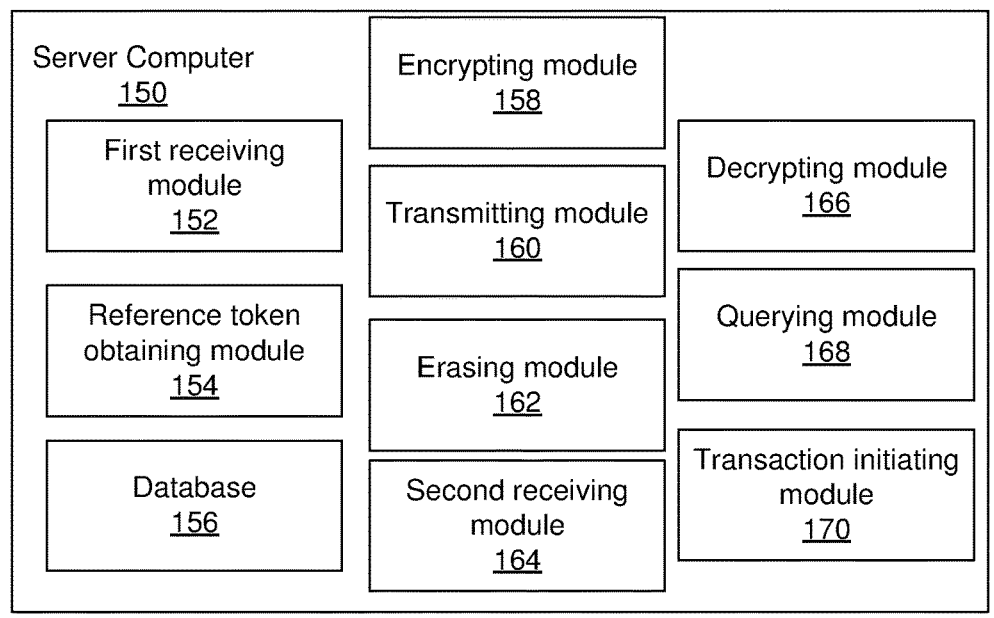
FIG. 2 is a block diagram illustrating logical components of an embodiment of a server computer according to the technology.

FIG. 2 is a block diagram of logical components of a server computer (150) on which embodiments of the technology can be implemented. The server computer (150) may be the merchant server (102), the payment service provider server (114) or a different server computer. The server computer (150) includes a first receiving module (152) for receiving cardholder data belonging to a consumer, the cardholder data including consumer credentials which are to be stored and at least one data item which is not to be stored, such as the CVV. The server computer (150) also includes a reference token obtaining module (154) for obtaining a unique consumer reference token, and a database (156) for storing the credentials which are to be stored in association with the consumer reference token. An encrypting module (158) is included for combining the consumer reference token and the data item which is not to be stored and encrypting the combination to form an encrypted token, and a transmitting module (160) is provided for transmitting the encrypted token to a third party for storage thereof by the third party. An erasing module (162) is operable to erase the encrypted token transmitted to the third party and the data item which is not to be stored from all memory of the server computer (150). A second receiving module (164) is included which is able to receive the encrypted token from the third party, and a decrypting module (166) is provided for decrypting the encrypted token to extract the consumer reference token and the data item which is not to be stored therefrom. A querying module (168) is capable of querying the database (156) to obtain the consumer credentials stored on the database, and a transaction initiating module (170) initiates a payment transaction using the consumer credentials stored on the database (156) together with the data item which is not to be stored. The functionality of the logical components will now be described in detail.

Figure 3:
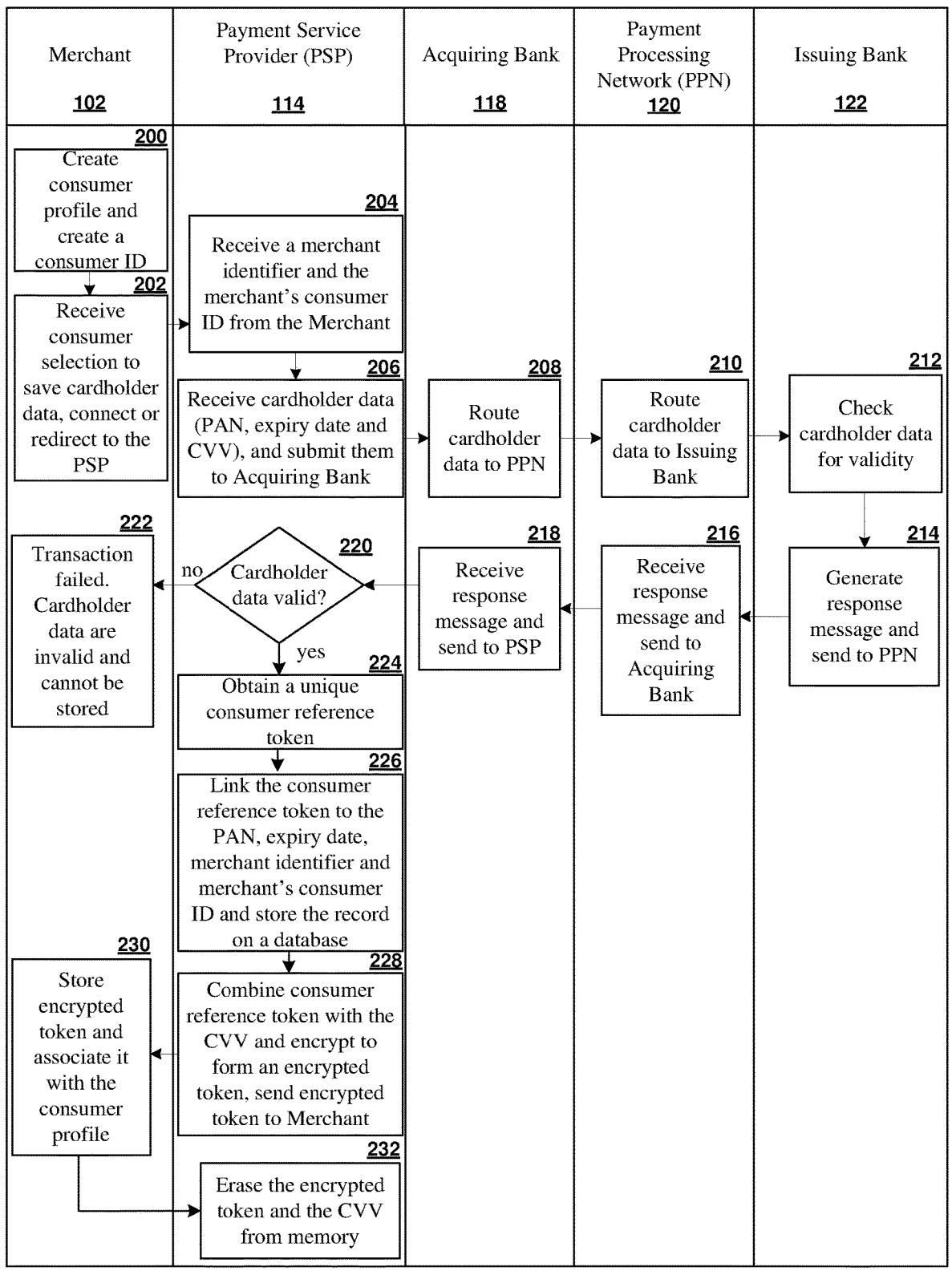
FIG. 3 is swim lane flow chart which illustrates a method of storing cardholder data according to an embodiment of the technology.

FIG. 3 is swim lane flow chart which illustrates one embodiment of technology, carried out during an initial stage in which cardholder data of a consumer is to be stored. At a first stage (200), a consumer creates a consumer profile on the e-commerce website of the merchant, and the merchant creates a consumer identifier (ID) associated with the consumer. The consumer then elects to input and save cardholder data at a next stage (202). The merchant e-commerce website then either redirects the consumer to the payment service provider, for example, by linking the consumer to a secure website hosted by the payment service provider, or alternatively the e-commerce website connects to the payment service provider by means of the API.

At a next stage (204), the payment service provider receives a merchant identifier from the merchant, which is an identifier unique to a particular merchant that is established during the stage when the merchant registers with the payment service provider. The merchant identifier enables the payment service provider to uniquely identify the merchant with which it is transacting. The payment service provider also receives the merchant's consumer ID.

At a next stage (206), the payment service provider then receives the cardholder data, in this case the consumer's PAN, expiry date and CVV. The cardholder data can be received either directly by the payment service provider in the case where the consumer was redirected to a secure website hosted by the payment service provider, or alternatively may be received from the merchant by means of the API in the case where the consumer enters the cardholder data on the merchant e-commerce website.

The payment service provider then submits the cardholder data to the acquiring bank of the merchant, which receives it at a next stage (208) and routes the cardholder data to the payment processing network. At a next stage (210), the payment processing network routes the cardholder data to the applicable issuing bank identified in the cardholder data. It will be appreciated that the issuing bank in respect of the consumer can, of course, be the same entity as the acquiring bank of the merchant. At a next stage (212), the issuing bank then checks the cardholder data for validity, generates a response message at a next stage (214) and sends the response message to the payment processing network. The payment processing network receives the response and sends it to the acquiring bank at a next stage (216), which receives the response and sends it to the payment service provider at a next stage (218). At a next stage (220), the payment service provider then checks the response to determine if the cardholder data is valid. If the cardholder data is not valid, the payment service provider sends a message to the merchant, at a next stage (222), that the transaction has failed and the cardholder data cannot be stored.

If the cardholder data is valid, the payment service provider creates a new, unique consumer reference token at a next stage (224). The unique consumer reference token may be a numeric or alphanumeric code that is unique to the particular cardholder data, and is chosen to be of sufficient length (e.g. 10 characters or longer) so as to be unique in respect of all consumers. The payment service provider then links this token to the PAN, expiry date, merchant identifier and the merchant's consumer identifier and stores the linked record on the payment service provider's database, at a next stage (226). In a preferred embodiment, the PAN and expiry date are encrypted before being linked to the consumer reference token and stored on the database.

At a next stage (228), the payment service provider combines the consumer reference token with the CVV and encrypts the combination to form an encrypted token. While the entire CVV may be combined with the consumer reference token, in some embodiments only a portion of the CVV is combined with the consumer reference token and the remaining portion is stored on the database together with the PAN and expiry date. Splitting the CVV in this way may increase security because even if the encrypted token is decrypted by an unauthorized party, that party will not have the entire CVV.

In a preferred embodiment, the consumer reference token and CVV are combined and encrypted by inputting both the CVV and consumer reference token into a hardware security module (HSM) of the payment service provider, which encrypts the combination using strong encryption. An HSM is a hardware device that is capable of running a secure operating system and provide secure key management to generate cryptographic keys, set the capabilities and security limits of keys, implement key backup and recovery, prepare keys for storage and perform key revocation and destruction. The HSM device can encrypt and decrypt data using Data Encryption Standard (DES), Triple Data Encryption Standard/Algorithm (TDES/TDEA), DES-X, Secure Socket Layer (SSL), Advanced Encryption Standard (AES), Blowfish, Serpent, Twofish, Threefish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols. Alternatively, encryption could be carried out without the use of an HSM, such as using software-based encryption.

The encrypted token is then transmitted to the merchant at a next stage (230), where the merchant stores it on the merchant's database in association with the consumer profile. The merchant also stores the consumer ID it created at the first stage (200) in association with the consumer profile. At the final stage (232), the payment service provider then erases the encrypted token and the CVV from all memory of the payment service provider.

It will be appreciated that the payment service provider does not store the CVV of the cardholder data, and does not retain the CVV in temporary memory for longer than it takes to complete the illustrated transaction flow. It will also be appreciated that the only information stored by the merchant is the consumer ID and the encrypted token. The encrypted token is a combination of the consumer reference token (itself a just a unique token generated by the PSP) and the CVV, which have been encrypted by the payment service provider and are thus incapable of being decrypted by or at the merchant.

Figure 4:
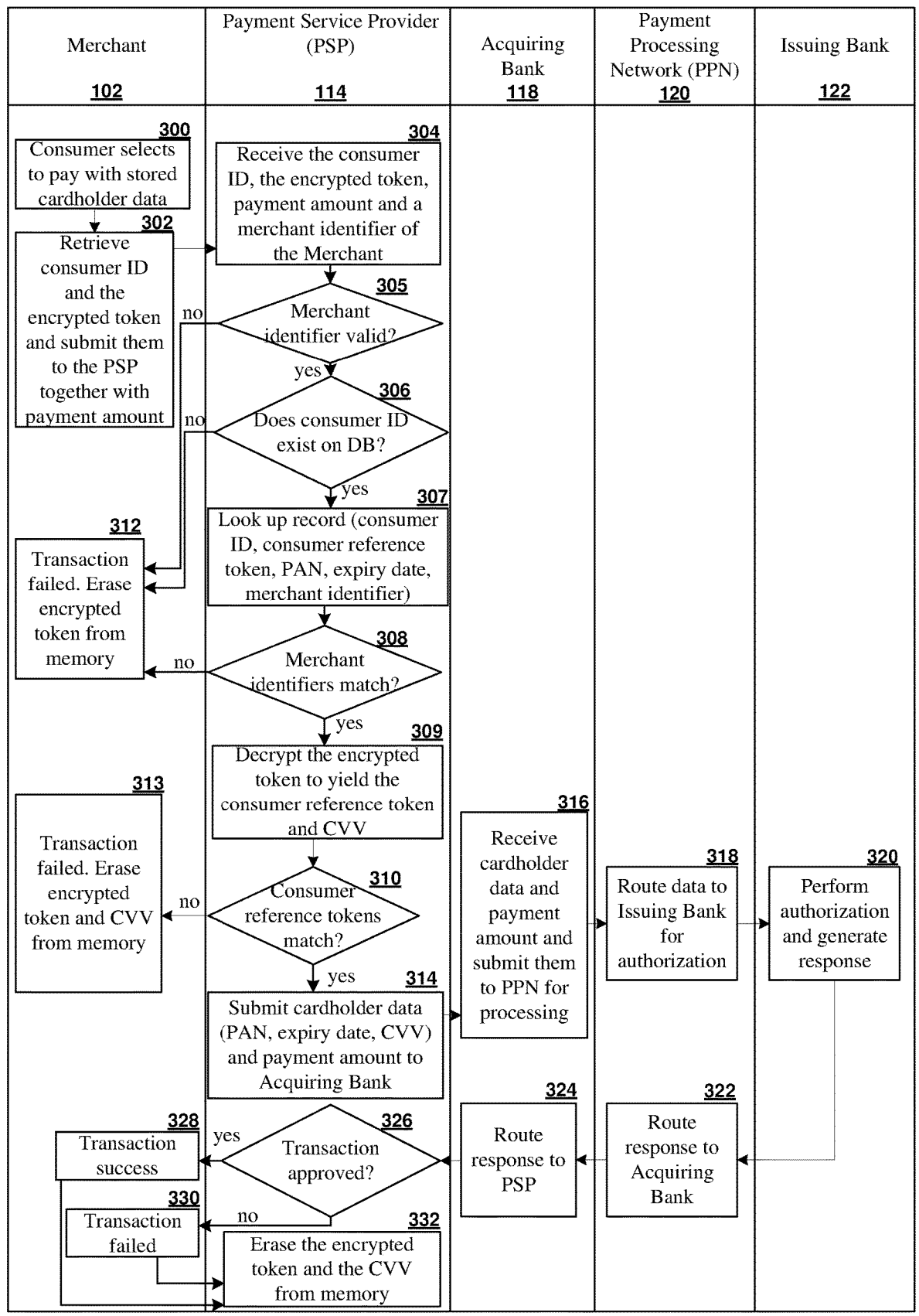
FIG. 4 is a swim lane flow chart which illustrates a method of processing transactions using stored cardholder data according to an embodiment of the technology.

FIG. 4 is a swim lane flow chart which illustrates processing a transaction during one or more subsequent stages in which the consumer selects to pay the merchant using stored cardholder data. At a first stage (300), the consumer selects to pay for a purchase on the merchant e-commerce website using cardholder data which has been previously stored according to the method illustrated in FIG. 3. At a next stage (302), the merchant queries the merchant database and retrieves the merchant's consumer ID and the encrypted token associated with the selected stored cardholder data. The merchant then submits this information, together with the payment amount, to the payment service provider.

At a next stage (304), the payment service provider receives the merchant's consumer ID, the encrypted token, the payment amount and also the merchant identifier of the particular merchant that is requesting payment. The merchant identifier is validated to make sure that the merchant has previously been set-up as a merchant with the PSP at a next stage (305). If the merchant is not valid, the transaction fails at an end stage (312) and the encrypted token is erased from memory.

If the merchant is valid, then at a next stage (306), the PSP checks if the received consumer ID is on the database. If it is not, then the transaction fails at the end stage (312). Otherwise, the PSP uses the merchant's consumer ID to look up the linked record on the PSP database, which contains the consumer ID, consumer reference token, PAN, expiry date and the merchant identifier.

At a next stage (308), the merchant identifier stored in the record is compared with the merchant identifier received from the merchant, and if they do not match then the transaction fails at the end stage (312). This could indicate that the encrypted token and consumer ID had been fraudulently obtained from an authorized merchant and an attempt was being made to use it by an unauthorized merchant. This stage, in other words, checks that the consumer ID does in fact belong to the correct merchant. If the merchant identifiers match, then at a next stage (309), the payment service provider uses the HSM to decrypt the encrypted token to yield the consumer reference token and the CVV. In the case where only a portion of the CVV was encrypted into the encrypted token, the remaining portion of the CVV is obtained by querying the database.

At a next stage (310), the consumer reference token stored on the record is then compared with the consumer reference token obtained from the HSM decryption to determine if they match as an additional security step to validate the encrypted token. If they do not match, then the transaction fails at a next stage (313), and the encrypted token and CVV are erased from memory. A failure of the consumer reference tokens matching could indicate internal fraud at the merchant, where someone with access to the merchant database attempts to assign an encrypted token associated with one consumer to a different consumer (i.e. to transact for themselves at the merchant using someone else's cardholder details). This step prevents the payment from proceeding if this had occurred.

If the consumer reference tokens match, then the payment service provider, at a next stage (314), submits the PAN, expiry date, CVV and payment amount to the merchant's acquiring bank for further processing. The further processing occurs according to normal transaction flow processes, where the acquiring bank receives the cardholder data and payment amount at a next stage (316) and submits it to the payment processing network, the payment processing network routes the cardholder data to the issuing bank for authorization at a next stage (318), the issuing bank performs authorization and generates a response message at a next stage (320), and the response is routed back through the payment processing network and the acquiring bank (stages 322 and 324) to the payment service provider. If, at a next stage (326), the transaction was approved as indicated by the message generated by the issuing bank, then the payment service provider sends a transaction success message to the merchant at a next stage (328) and the payment service provider erases the encrypted token and the CVV from memory at the final stage (332). If the transaction was not approved, the payment service provider sends a transaction failure message to the merchant at a next stage (330), and the payment service provider erases the encrypted token and the CVV from memory at the final stage (332).

It will be appreciated that, by having the merchant submit the stored encrypted token to the payment service provider for decryption, the need for the consumer to re-enter the CVV each time a purchase is requested by the consumer is avoided. The transaction is, however, still submitted to the acquiring bank with the CVV number, but importantly, the CVV was never stored by the payment service provider and was not stored in a readable format by the merchant.

The technology enables transactions that are more secure and less susceptible to fraud than transactions which are processed without CVV numbers, and can be used in respect of those card-not-present transactions where the use of the CVV number is mandatory.

By avoiding the need for a consumer to re-enter a CVV number, the merchant can enable a single-action checkout procedure for its consumers, in which the consumer is able to pay using stored cardholder data by performing a single action such as clicking on a payment button, thus facilitating a simplified consumer check-out process. This may be especially advantageous where the consumer is transacting on a mobile device where entering information may be less convenient than on other devices such as laptop and desktop computers.

While embodiments have been described with reference to avoiding the need for CVV numbers to be re-entered, the invention is not so limited and the same technology could be used for avoiding the need for consumers or customers to re-enter other kinds of information such as passcodes, personal identification numbers or passwords.

Numerous other variations can also be made to the embodiment described in FIGS. 3 and 4. For example, in the described embodiment the merchant and payment service provider are separate entities, but in a different embodiment the steps of the method are performed by the merchant only. In such a case, it is the merchant which generates the consumer reference token and combines it with the CVV to form the encrypted token. In such an embodiment, the third party that stores the encrypted token could be a different merchant, other third party secure data store, or an electronic device of the consumer, such as a mobile device of the consumer.

Figure 5:
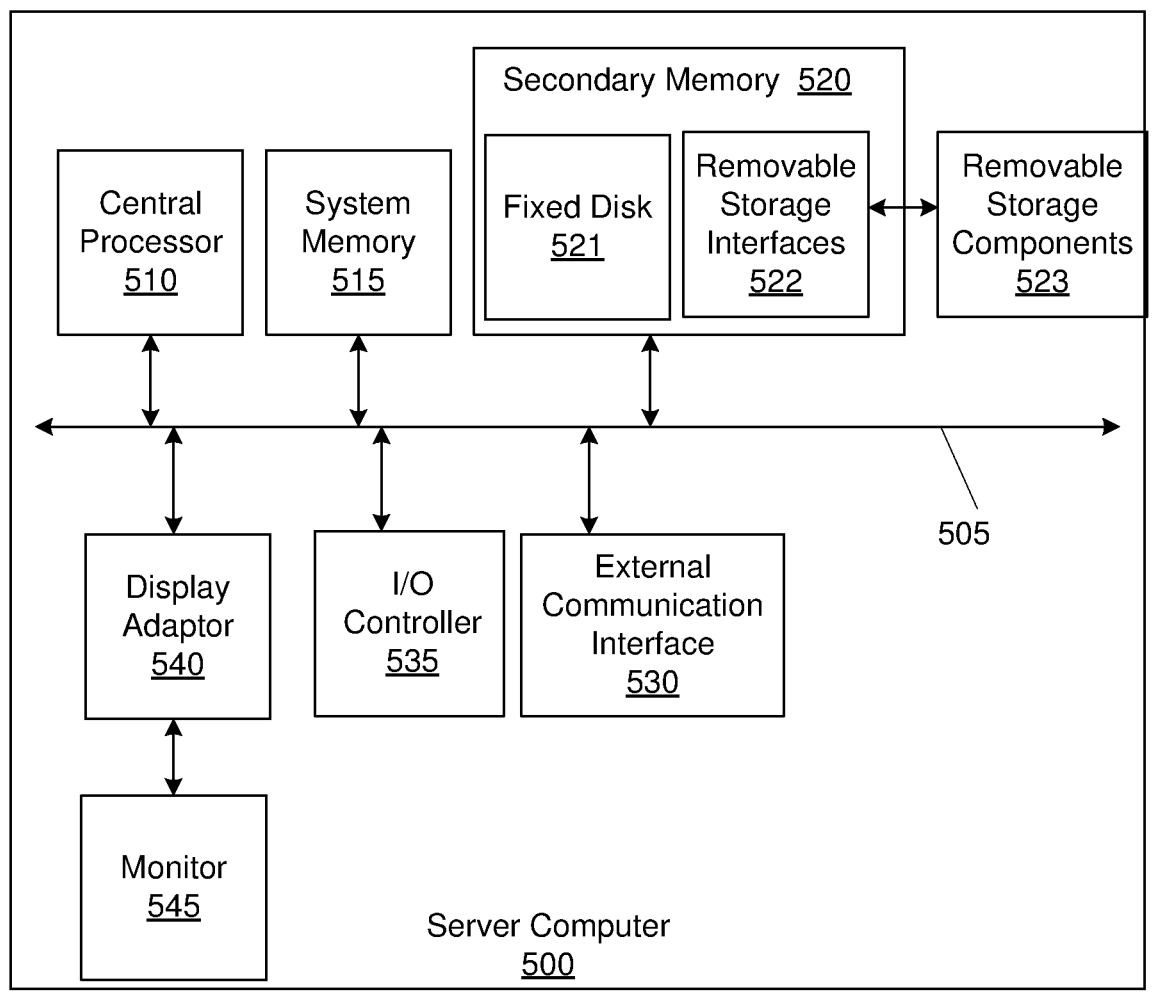
FIG. 5 is an example of hardware components of a server computer which may be used in embodiments of the technology.

FIG. 5 illustrates an example of a server computer (500) in which various aspects of the disclosure may be implemented. The server computer (500) may be suitable for storing and executing computer program code. The various participants and elements in the previously described system diagrams may use any suitable number of subsystems or components of the server computer (500) to facilitate the functions described herein.

The server computer (500) may include subsystems or components interconnected via a communication infrastructure (505) (for example, a communications bus, a cross-over bar device, or a network). The server computer (500) may include at least one central processor (510) and at least one memory component in the form of computer-readable media.

The memory components may include system memory (515), which may include read only memory (ROM) and random access memory (RAM). A basic input/output system (BIOS) may be stored in ROM. System software may be stored in the system memory (515) including operating system software.

The memory components may also include secondary memory (520). The secondary memory (520) may include a fixed disk (521), such as a hard disk drive, and, optionally, one or more removable-storage interfaces (522) for removable-storage components (523).

The removable-storage interfaces (522) may be in the form of removable-storage drives (for example, magnetic tape drives, optical disk drives etc.) for corresponding removable storage-components (for example, a magnetic tape, an optical disk etc.), which may be written to and read by the removable-storage drive.

The removable-storage interfaces (522) may also be in the form of ports or sockets for interfacing with other forms of removable-storage components (523) such as a flash memory drive, external hard drive, or removable memory chip, etc.

The server computer (500) may include an external communications interface (530) for operation of the server computer (500) in a networked environment enabling transfer of data between multiple server computers (500). Data transferred via the external communications interface (530) may be in the form of signals, which may be electronic, electromagnetic, optical, radio, or other types of signal.

The external communications interface (530) may enable communication of data between the server computer (500) and other server computers including external storage facilities. Web services may be accessible by the server computer (500) via the communications interface (530). The external communications interface (530) may also enable other forms of communication to and from the server computer (500) including, voice communication, near field communication, Bluetooth, etc.

The computer-readable media in the form of the various memory components may provide storage of computer-executable instructions, data structures, program modules, and other data. A computer program product may be provided by a computer-readable medium having stored computer-readable program code executable by the central processor (510). A computer program product may be provided by a non-transient computer-readable medium, or may be provided via a signal or other transient means via the communications interface (530).

Interconnection via the communication infrastructure (505) allows a central processor (510) to communicate with each subsystem or component and to control the execution of instructions from the memory components, as well as the exchange of information between subsystems or components.

Peripherals (such as printers, scanners or the like) and input/output (I/O) devices (such as a mouse, touchpad, keyboard, microphone, or the like) may couple to the server computer (500) either directly or via an I/O controller (535). These components may be connected to the server computer (500) by any number of means known in the art, such as a serial port. One or more monitors (545) may be coupled via a display or video adapter (540) to the server computer (500).

The foregoing description has been presented for the purpose of illustration; it is not intended to be exhaustive or to limit the invention to the precise forms disclosed. Persons skilled in the relevant art can appreciate that many modifications and variations are possible in light of the above disclosure. Some portions of this description are in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM) or a read-only memory (ROM). Any such computer-readable medium may also reside on or within a single computational apparatus, and may be present on or within different computational apparatuses within a system or network. Any of the steps, operations, or processes described herein may be performed or implemented with one or more hardware or software modules, alone or in combination with other devices. In one embodiment, a software module is implemented within a computer program product comprising a non-transient computer-readable medium containing computer program code, which can be executed by a computer processor for performing any or all of the steps, operations, or processes described herein.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention not be limited by this detailed description, but rather by any claims that issue on an application based hereon.

The invention claimed is:

1. A method conducted at a payment service provider (PSP) server in communication with a server of a merchant that transacts with a consumer, comprising:
   receiving, as part of a purchase transaction between the consumer and the merchant, cardholder data belonging to the consumer, the cardholder data including a first portion to be stored by the PSP server and a second portion which is not to be stored by the PSP server, both the first and second portions required for authorizing a transaction;
   generating a unique consumer reference token;
   storing, the first portion of the received cardholder data on a database of the PSP server in association with the consumer reference token;
   combining, the consumer reference token with the second portion of the received cardholder data and generating an encrypted token by encrypting the combination;
   transmitting, the encrypted token from the PSP server to the server of the merchant for remote storage thereof by the merchant for use in subsequent transactions between the consumer and the merchant; and
   erasing, the encrypted token and the second portion of the received cardholder data from all memory of the PSP server;
   receiving, as part of a subsequent transaction between the consumer and the merchant, the encrypted token;
   decrypting, the encrypted token and re-obtaining the second portion of the cardholder data and the consumer reference token;
   determining whether the re-obtained consumer reference token and the consumer reference token stored on the databased match by comparing the re-obtained consumer reference token with the consumer reference token stored on the database;
   based on determining that the re-obtained consumer reference token and the consumer reference token stored on the database do not match, canceling the transaction, or if they do match, proceeding with the transaction;
   retrieving, from the database the stored first portion of the cardholder data; and
   obtaining, authorization for the transaction using the first portion together with the second portion of the cardholder data; and
   erasing, the encrypted token and the second portion of the cardholder data from all memory of the PSP server.

2. The method as claimed in claim 1, wherein the method includes the steps of:
   receiving, a consumer identifier (ID), and
   storing, the consumer ID in association with the consumer reference token on the database;
   receiving, during the subsequent transaction, the consumer ID; and
   querying, the database to find the stored consumer reference token that is associated with the consumer ID.

3. The method as claimed in claim 1, wherein the method includes the steps of:
   receiving, an identifier of the merchant from the server of the merchant; and
   storing, the identifier of the merchant in association with the consumer reference token on the database; and
   receiving, during the subsequent transaction, the identifier of the merchant from the merchant server; and
   performing, a check to ensure that the merchant providing the encrypted token is the same merchant as the merchant linked to the consumer reference token, and if the merchant is not the same, canceling the transaction.

4. The method as claimed in claim 1, wherein the merchant operates an e-commerce website, and the merchant receives the cardholder data from the consumer by means of the e-commerce website and transmits the cardholder data to the PSP server through an application programming interface (API) between the merchant server and the payment service provider server.

5. The method as claimed in claim 1, wherein the merchant operates an e-commerce website, and upon receiving a request from the consumer to purchase an item, the merchant e-commerce website redirects the consumer to an electronically accessible interface of the payment service provider server where the cardholder data is input by the consumer.

6. The method as claimed in claim 1, wherein the merchant operates an e-commerce website, the merchant enables the consumer to create a consumer profile with the merchant, and upon receiving the encrypted token from the payment service provider server, the merchant stores the encrypted token in association with the consumer profile for later retrieval.

7. The method as claimed in claim 1, wherein the cardholder data is received from an electronic device of the consumer, and the encrypted token is transmitted to the electronic device of the consumer for remote storage.

8. The method as claimed in claim 1, wherein the cardholder data includes a Primary Account Number (PAN), an expiry date, and a Card Verification Value (CVV), the first portion to be stored is the PAN and expiry date, and the second portion not to be stored is the CVV.

9. The method as claimed in claim 1, wherein after the step of receiving the cardholder data the method includes the steps of:
transmitting, the cardholder data to an acquiring bank of a merchant, which in turn routes the cardholder data to an issuing bank of the consumer through a payment processing network for the issuing bank to validate the cardholder data,
receiving, a response from the acquiring bank indicating whether the cardholder data is valid or not, in response to the acquiring bank indicating that the cardholder data is not valid,
generating, a failure message indicating that the cardholder data provided was invalid and cannot be stored and preventing further steps of the method from being carried out, and
in response to the acquiring bank indicating that the cardholder data is valid, carrying out the further steps of the method.

10. The method as claimed in claim 1, wherein the consumer reference token and the second portion which is not to be stored are combined and encrypted using a hardware security module.

11. The method as claimed in claim 1, wherein the payment transaction is initiated by transmitting the first and second portions to an acquiring bank of a merchant, which is able to further process the payment transaction by means of a payment processing network.

12. A system for storing cardholder data and initiating payment transactions comprising a payment service provider (PSP) server in communication with a server of a merchant that transacts with a consumer, the PSP server having:
a first receiving module for receiving, as part of a purchase transaction between the consumer and the merchant, cardholder data belonging to the consumer, the cardholder data including a first portion to be stored and a second portion which is not to be stored by the PSP server, both the first and second portions required for authorizing a transaction;
an obtaining module for, in response to receiving, as part of the purchase transaction between the consumer and the merchant, the cardholder data, generating, a unique consumer reference token;
a database for storing, the first portion of the received cardholder data in association with the consumer reference token;
an encrypting module for combining, the consumer reference token with the second portion of the received cardholder data and generating an encrypted token by encrypting the combination
a transmitting module for transmitting, the encrypted token from the PSP server to the server of the merchant for remote storage thereof by the merchant for use in subsequent transactions between the consumer and the merchant;
an erasing module for erasing, the encrypted token and the second portion of the received cardholder data from all memory of the PSP server;
a second receiving module for receiving, transaction information for a subsequent transaction from the merchant, the subsequent transaction information including the encrypted token;
a decrypting module for decrypting, the encrypted token and re-obtaining the second portion of the cardholder data and the consumer reference token;
a validation module for determining whether the re-obtained consumer reference token and the consumer reference token stored on the database match by comparing the re-obtained consumer reference token with the consumer reference token stored on the database; and
based on determining that the re-obtained consumer reference token and the consumer reference token stored on the database do not match, canceling the transaction, or if they do match, proceeding with the transaction;
a querying module for retrieving, from the database the stored first portion of the cardholder data;
a transaction initiating module for obtaining, authorization for the transaction using the first portion together with the second portion of the cardholder data; and
an erasing module for erasing, the encrypted token and the second portion of the cardholder data from all memory of the PSP server.

13. A method conducted at a merchant server in communication with a payment service provider (PSP) server, the merchant server transacting with a consumer, the method comprising:
receiving, from a consumer, as part of a purchase transaction between the consumer and a merchant corresponding to the merchant server, cardholder data belonging to the consumer, the cardholder data including a first portion to be stored by the merchant server and a second portion which is not to be stored by the merchant server, both the first and second portions required for authorizing a transaction;
generating, a unique consumer reference token;
storing, the first portion of the received cardholder data on a database in association with the consumer reference token;
combining, the consumer reference token with the second portion of the received cardholder data and generating an encrypted token by encrypting the combination;
transmitting, the encrypted token from the merchant server to the PSP server for remote storage thereof by the PSP server for use in subsequent transactions between the consumer and the merchant; and
erasing, the encrypted token and the second portion of the received cardholder data from all memory of the merchant server;
receiving, as part of a subsequent transaction between the consumer and the merchant the encrypted token;

decrypting, the encrypted token and re-obtaining the second portion of the cardholder data and the consumer reference token;

determining whether the re-obtained consumer reference token and the consumer reference token stored on the databased match by comparing the re-obtained consumer reference token with the consumer reference token stored on the database;

based on determining that the re-obtained consumer reference token and the consumer reference token stored on the database do not match, canceling the transaction, or if they do match, proceeding with the transaction;

retrieving, the stored first portion of the cardholder data; and obtaining, authorization for the transaction using the first portion together with the second portion of the cardholder data; and erasing, the encrypted token and the second portion of the cardholder data from all memory of the merchant server.

* * * * *